United States Patent
Burkhardt et al.

[15] 3,669,230
[45] June 13, 1972

[54] DRIVE FOR SHIPS

[72] Inventors: Walter Burkhardt; Herbert Wedler, both of Witten, Germany

[73] Assignee: Lohmann & Stolterfoht Aktiengesellschaft, Witten, Germany

[22] Filed: Aug. 21, 1970

[21] Appl. No.: 65,798

[30] Foreign Application Priority Data

Sept. 5, 1969 Germany.....................P 19 45 797.7

[52] U.S. Cl..............................192/48.8, 74/15.2, 74/15.63, 74/661, 74/665 N
[51] Int. Cl...................................F16d 21/02, F16h 37/06
[58] Field of Search............192/48.8; 74/661, 665 L, 665 M, 74/665 N, 15.2, 15.63; 60/97 R; 123/DIG. 8

[56] References Cited

UNITED STATES PATENTS

| | | | |
|---|---|---|---|
| 2,261,432 | 11/1941 | Cooke | 192/48.8 |
| 2,237,322 | 4/1941 | West | 74/15.2 X |
| 2,287,302 | 6/1942 | Gifford et al. | 74/15.2 X |
| 2,613,778 | 10/1952 | Carlson | 192/48.8 |
| 1,710,962 | 4/1929 | Banner | 60/97 R |
| 2,531,818 | 11/1950 | Kranick | 74/15.2 X |
| 2,489,910 | 11/1949 | Lieberherr | 60/97 R |
| 3,214,998 | 11/1965 | Hall | 74/661 |
| 3,487,721 | 1/1970 | Burkhardt et al. | 74/665 N |
| 2,760,612 | 8/1956 | Brooks | 60/97 X |
| 2,958,338 | 11/1960 | Bachmann | 60/97 X |

*Primary Examiner*—Allan D. Herrmann
*Attorney*—Smyth, Roston & Pavitt and Ralf H. Siegemund

[57] ABSTRACT

A drive train for ships with plural engines, plural input and common output reduction gearing coupled to the propeller shaft. Resilient shift clutches couple each engine to the reduction gear. Each reduction gear input is received by a hollow shaft and coupled to the input of the respective shift clutch. The hollow shaft is geared to an auxiliary shaft for driving auxiliary equipment.

7 Claims, 4 Drawing Figures

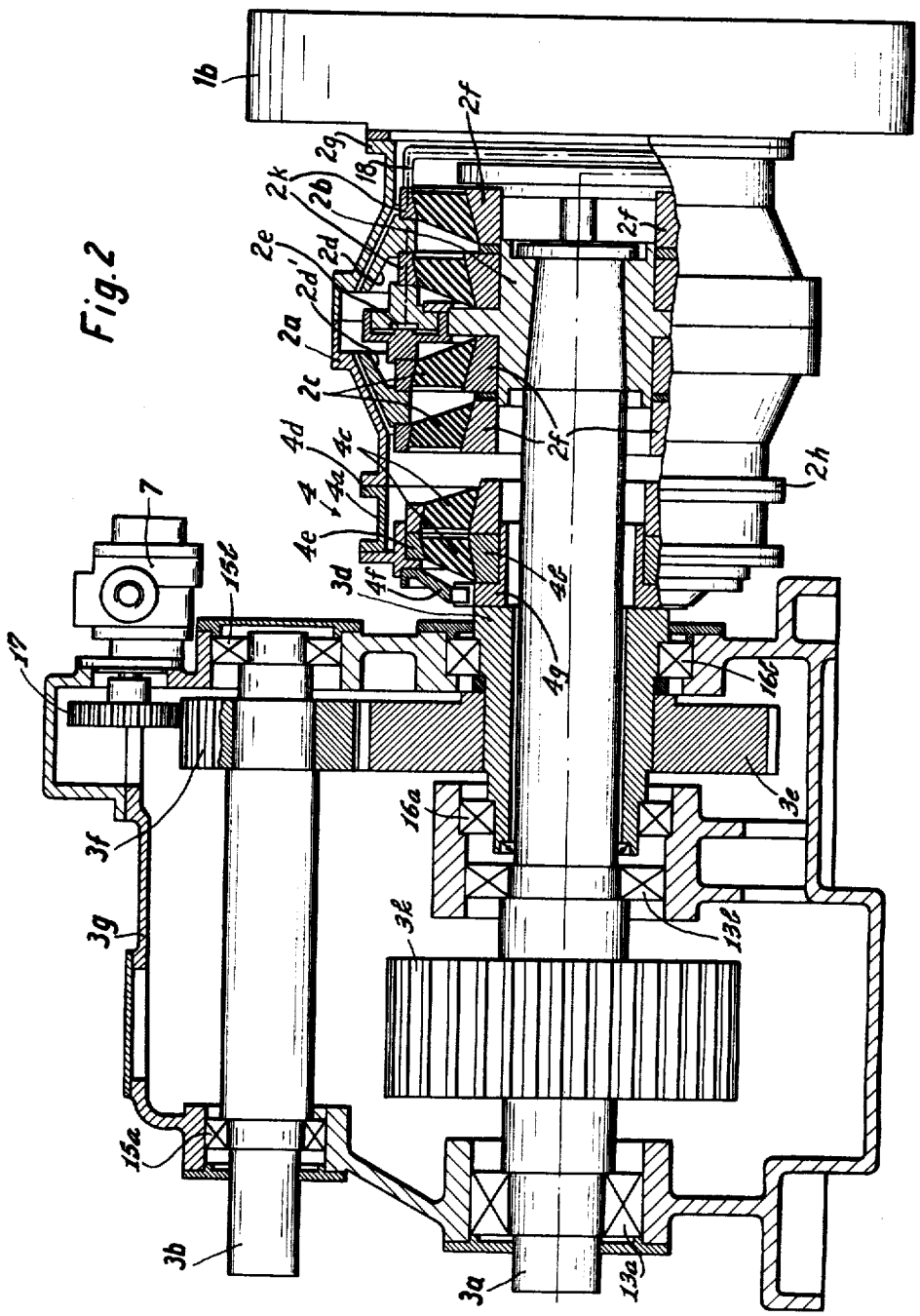

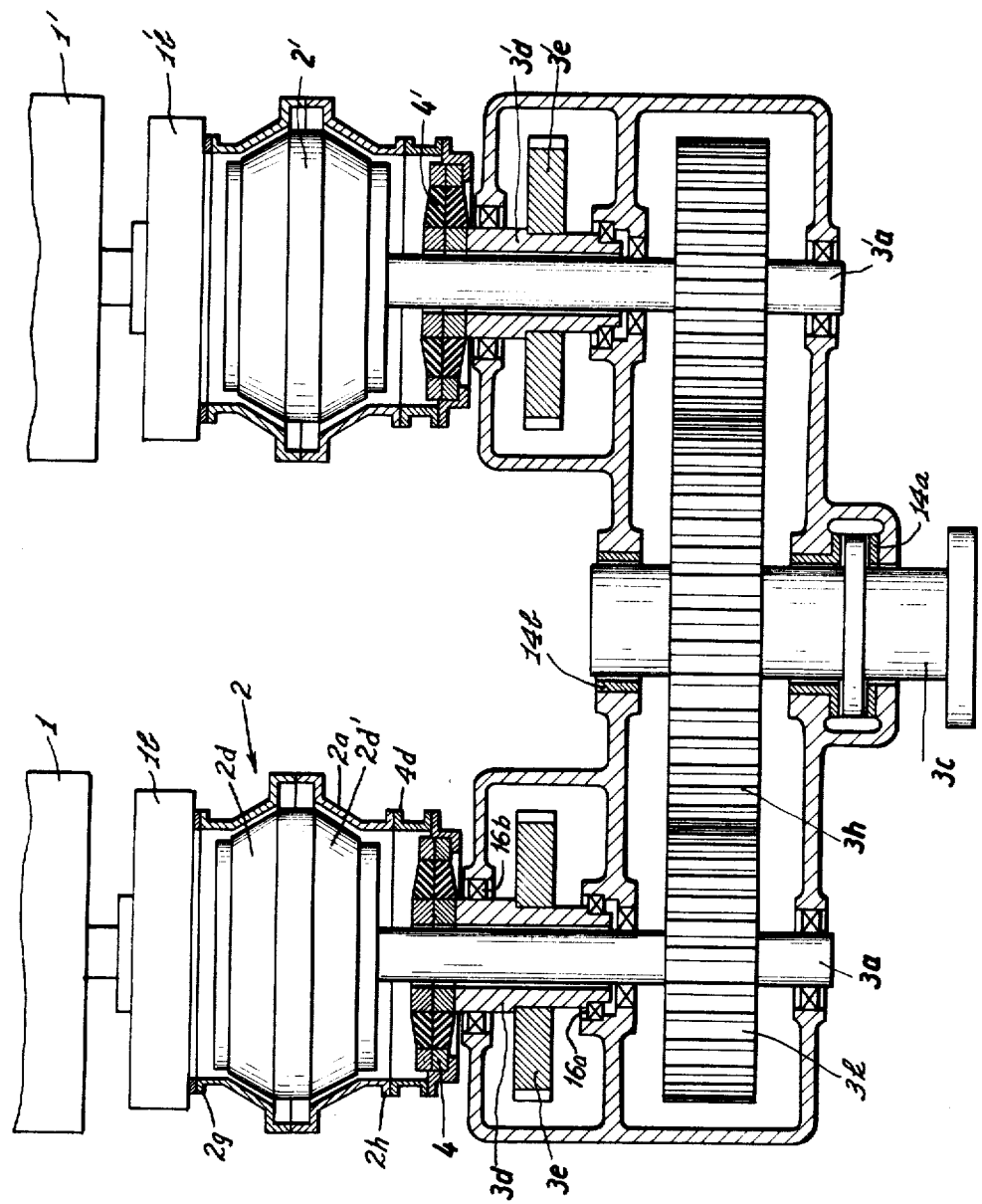

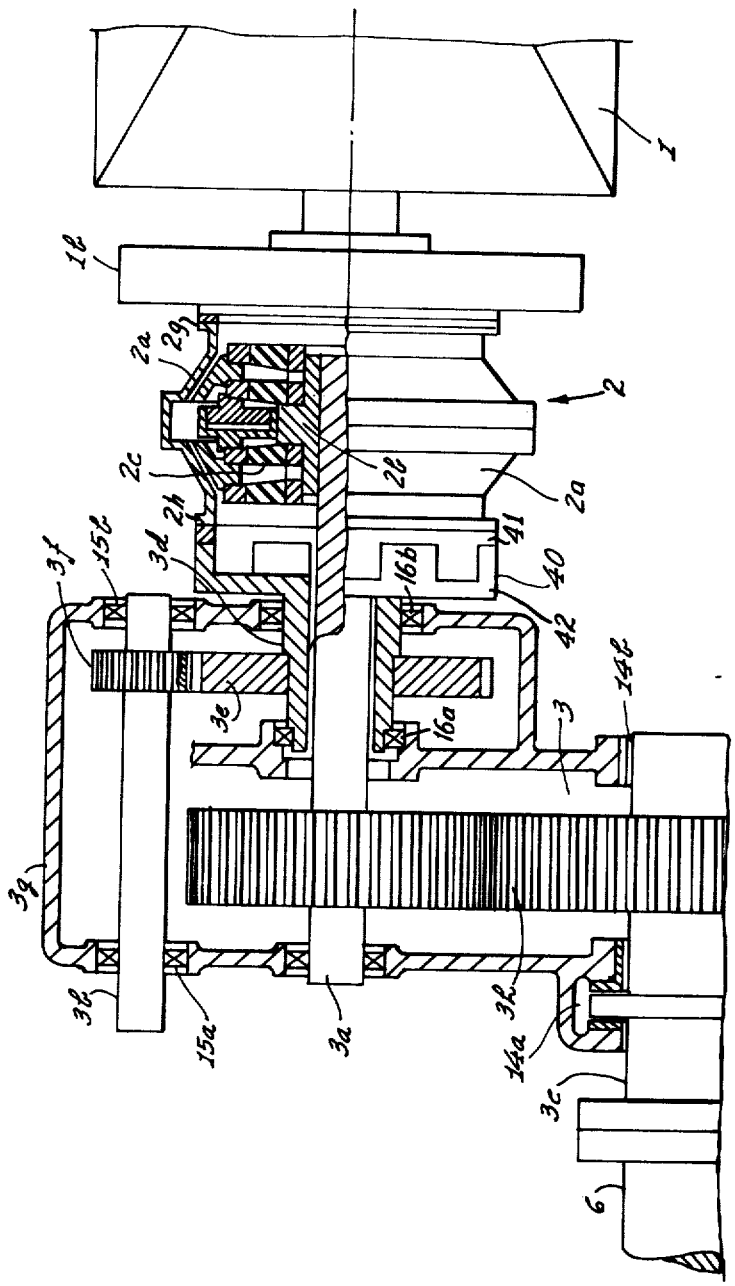

DRIVE FOR SHIPS

The present invention relates to a drive system for ships having one or more main engines, speed reducing gearing coupled to a propeller shaft, and having shift clutches for individually coupling the engine or engines to input(s) of the reduction year.

Drive systems of this type are used in ships, particularly with two engines and at least one auxiliary shaft in the housing of the reduction gear for driving auxiliary equipment. The auxiliary shaft is permanently coupled to the shaft of one of the main engines by a single step gear train. The known drive system has, additionally, the following features.

A resilient clutch is provided between the shaft of each main engine and the respectively associated input shaft of the reduction gear. A gear wheel is provided in the gear box, on the respective input shaft of the reduction gear. The auxiliary shaft referred to above, carries a pinion that meshes with this gear wheel. The input shaft is telescoped in parts, in a hollow shaft carrying a steel pinion that meshes with the greater wheel of the reduction gear as providing the speed reduced output. The shaft for the greater wheel is connected to the propeller shaft.

Hollow shaft and input shaft for the reduction gear have one end each located adjacent to each other and interconnected by a resilient shift clutch. The particular main engine is selectively connectable to reduction gearing and propeller shaft by means of that clutch, while the auxiliary shaft is permanently coupled to that engine. The aforementioned hollow shaft is journalled in the gear box by means of two bearings. The input shaft for the reduction gear is journalled in the housing, as well as in the hollow shaft.

The aforementioned system has, thus, two separate couplings: a resilient coupling between engine and reduction gear input, and a shift clutch inside of the gear box. Such an arrangement is expensive. Also, the pinion shaft, driving the greater wheel of the reduction gear, is provided as a hollow shaft, and it is an expensive, forged part, and the bearing for that type of shaft are rather large.

Also, it is difficult to match the resilient clutch between engine and gear to the power requirements of the auxiliary shaft, unless, still another coupling is interposed between auxiliary shaft and the equipment it drives, e.g., a generator.

The problem solved by the invention is to provide a differently arranged drive system, using some of the components as mentioned above, but providing a different, more economical interrelationship of parts and arrangement.

In accordance with the preferred embodiment of the invention, it is suggested to provide a resilient shift clutch between a main engine and driven input of the reduction gear. In case of multiple engines, there is one such clutch for each engine and for the respectively associated input of the reduction gear. Particularly, the input side of the clutch connects directly to engine flange or to a fly wheel, if any, on the engine shaft. The clutch output is directly connected to the pinion shaft of the reduction gear, i.e., the shaft carrying the pinion that meshes the greater wheel of the reduction gear. The pinion shaft is coaxially disposed in a hollow shaft, the latter carrying a gear wheel. An auxiliary shaft is also journalled in the gear housing and carries a pinion meshing the gear on the hollow shaft. A coupling drivingly connects the input side of the shift clutch with the hollow shaft. In particular, the driven input of the shift clutch is concentrical to its output, so is the driven input for the coupling. These two inputs are axially interconnected.

The coupling is a resilient one in the preferred form of practicing the invention, unless incompatible with the oscillation and vibratory characteristics of the system as a whole. In this case a jaw gear clutch is used instead.

It is another feature of the invention to provide two fold bearing supports for the hollow shaft, for journalling the latter in the housing, independently from the pinion shaft as received by the hollow shaft. The pinion shaft, in turn, is likewise journalled in the housing by two bearing structure, independently from journalling of the hollow shaft.

The invention is particularly suitable in case the auxiliary shaft is rated for half of the engine power. The resilient shift clutch may have a particular number of rubber elements. About half that number of the same type of rubber elements can be used in the coupling between clutch and hollow shaft.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a vertical section view in greater detail of the arrangement as shown in FIG. 1, the section plane running through auxiliary shaft, shift clutch and coupling as driven from one engine;

FIG. 3 is a horizontal section view through reduction gear with dual inputs and single output, showing also two shift clutches and two engines; and FIG. 4 is similar to 1 with a jaw coupling in lieu of a flexible coupling.

Figure 1:
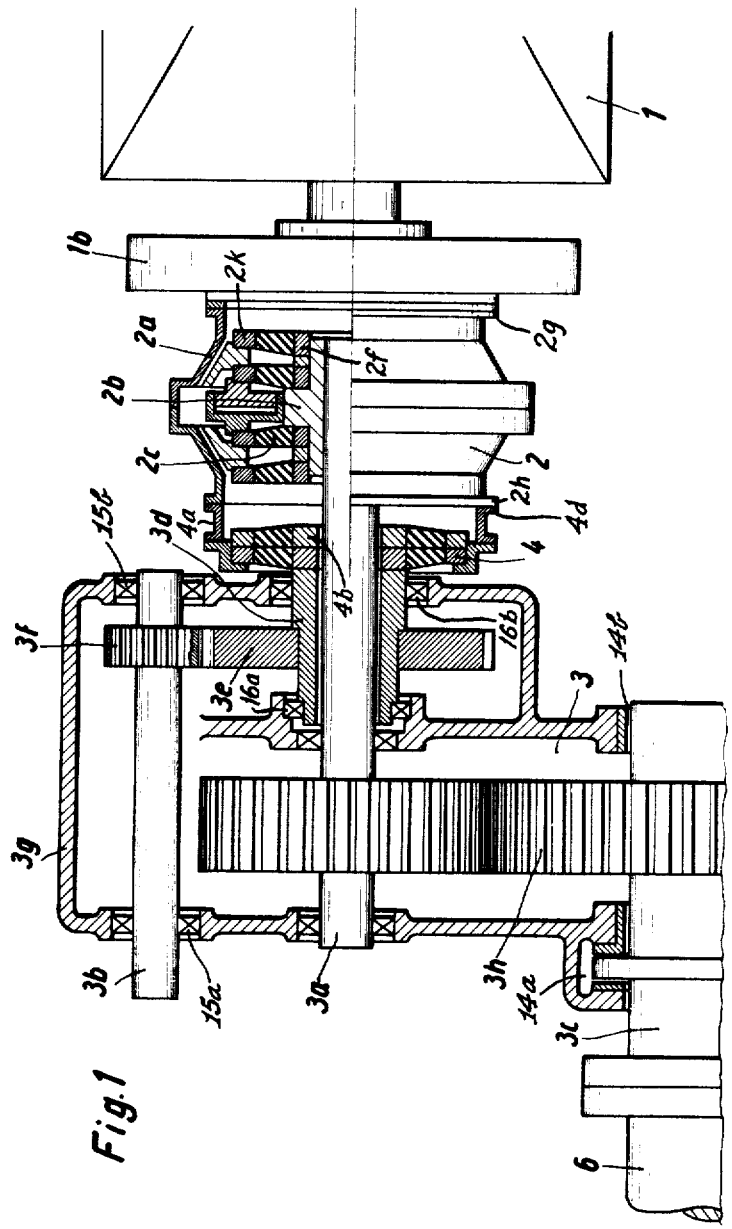
FIG. 1 is a section view, schematic to some extent, of an arrangement in accordance with the preferred embodiment of the invention, the section being taken vertically through an auxiliary shaft, to the common axis of one pinion shaft, the section then continues in a horizontal plane through the propeller shaft.

Proceeding now to the detailed description of the drawings, the driving equipment is comprised of two principal drive engines 1 and 1'. These engines are selectively connectable to a single reduction gear 3, respectively through elastic shift clutches 2 and 2'. The reduction or step down gear 3 is disposed in a housing or gear box 3g and drives a propeller shaft 6. The clutches 2 and 2' are disposed physically between the respective engines 1, 1' and the respective inputs for the gearing 3. Similar parts for the two drives are distinguished by ('). Looking now particularly to the clutch 2 as shown in FIG. 1, the input side 2a has an axial flange 2G connected to a flywheel 1b as driven by engine 1. The secondary or output part 2b of clutch is concentric to input 2a and connected to the associated input or drive shaft 3a of reduction gear 3.

The clutch 2 is constructed as resilient, pneumatically shiftable, double cone friction clutch. Line 18 denotes the pneumatic input for the selective control of the shift clutch. The interior parts of each clutch, that are being shifted, are connected to shaft 3a by means of known, disk shaped rubber parts 2c.

The shift clutch has a twin cone as represented by cone 2d and cone 2d', mounted for selective spreading by piston-cylinder arrangement 2e. Line 18 leads to that arrangement. Numeral 2f identifies mounting rings for rubber disks 2c. Rings 2f are secured to part 2b. Disks 2f couple mounting ring 2k on cones 2d-2d' to the output part 2b of the clutch. Double cone 2d-2d' selectively coacts with double-cone clutch housing 2a that forms the input of clutch 2 and has the first axial end flange 2g for connection to fly wheel 1b; the clutch input 2a has a second axial end flange 2h for connection to a flange 4d of coupling 4.

For details of such a shift clutch reference is made to U.S. Pat. application No. 126,927, filed Mar. 22, 1971, but having priority date prior to the filing date of this application.

The two shift clutches 2 and 2' in FIG. 3 are selectively and individually operable in that manner.

Input shaft 3a of reduction gear 3 is journalled in gearing housing 3g by means of two bearing structures 13a and 13b. A steel pinion 3k on shaft 3a meshes the greater wheel 3h of reduction gear 3. Gear 3h is disposed on an output shaft 3c of the reduction gear, and shaft 3c, in turn, is connected to propeller shaft 6. The shaft 3c is likewise journalled in housing 3g by means of two bearings 14a and 14b. The particular bearing 14a, adjacent shaft 6, is provided to take up thrust of the propeller shaft.

Each of the two pinion shafts, such as 3a, is associated with an auxiliary shaft, 3b. The auxiliary shafts are likewise journalled in housing 3g. In particular, shaft 3b is journalled by means of two bearings 15a and 15b. Preferably, each auxiliary shaft drives a generator (not shown). The particularly illustrated auxiliary shaft 3b is shown to have pinion 3f meshing a pinon 17 pertaining to input gearing for driving an oil pump 7.

The two auxiliary shafts are driven via resilient couplings 4 and 4' respectively, and hollow shafts 3d and 3d'. *In particular, the primary or input side 4a* of, for example, coupling 4, has axial flange 4d by means of which it is connected to the corresponding axial flange 2n of the input 2a of clutch 2. It can readily be seen that part 2a has dual function. It provides radially effective, rotary input for the shift clutch as associated with engine 1; additionally, part 2a serves an axial spacer and coupling element for the input 4a of coupling 4 by means of a flange 4d. The input annulus 4a supports holders 4e for rubber elements 4c of resilient coupling 4. These elements 4c are secured to ring 4b and holder 4e and they have similar dimensions as the rubber elements 2c of resilient shift clutch 2. Thus, the auxiliary power output has been rated half that of the principal propeller drive.

The secondary or output side of coupling 4 is a flanged sleeve 4g on which are mounted the output side holders 4b of the coupling. The sleeve 4g is disposed concentrically to the input of the coupling, and the flange of sleeve 4g is axially and drivingly connected to hollow shaft 3d. The shaft projects from housing 3g, at the driven input side of gear 3. A cover 4f is disposed axially to the resilient elements 4c and is secured to 4a. Hollow shaft 3d is telescoped concentrically with pinion shaft 3a. However, shaft 3d is journalled in housing 3g independently from pinion shaft by means of two separate bearings 16a and 16b. Hollow shaft 3d carries a gear 3e meshing pinion 3f on auxiliary shaft 3b.

As illustrated in FIG. 4, a jaw clutch coupling 40 may be substituted for resilient coupling 4 without change of the principal design. The jaw coupling has an input element 41 that connects to the axial end flange 2h of clutch part 2a. The jaw coupling has an output part 42 that merges into the hollow shaft 3d. One will choose a jaw coupling if oscillation characteristics of the system as a whole can be improved in that manner.

The construction, as illustrated, demonstrates that the provision of combined couplings 2–4 and 2'–4' is less expensive than provision of two separate couplings in each case, as known in the art. The pinion 3k meshing greater gear wheel 3h of the reduction gear may be constructed significantly smaller as it is not provided on a hollow shaft but on a solid shaft. For a given reduction ratio, the greater wheel 3h can be made correspondingly smaller so that the entire driving arrangement is more compact.

The invention is not limited to the embodiments described above but all changes and modifications thereof not constituting departures from the spirit and scope of the invention are intended to be included.

We claim:

1. Drive for ships having at least one drive engine, propeller shaft and reduction gear, disposed in a housing and having a pinion shaft with pinion journalled in the housing and meshing with a gear wheel connected to the propeller shaft, the combination comprising:

a resilient shift clutch having input and output parts, and disposed between engine and reduction gear, the input part being concentrically disposed to the output part and to the pinion shaft, further connected to the drive output of the engine, the output part of the clutch connected to the pinion shaft of the reduction gear;

a hollow shaft, receiving and traversed by the pinion shaft, but being journalled in the housing independently from the pinion shaft and from the shift clutch, and carrying a gear wheel;

a coupling having input and output, the input thereof being concentrical to the hollow shaft and axially connected directly to and driven by the input part of the shift clutch, the output of the coupling connected to and driving the hollow shaft; and an auxiliary shaft journalled in the housing of the reduction gear and having a pinion, meshing with the gear wheel on the hollow shaft so that the auxiliary shaft is driven via said clutch, input coupling and hollow shaft.

2. Drive as in claim 1, the coupling being a resilient coupling.

3. Drive as in claim 1, the coupling being a jaw coupling.

4. Drive as in claim 1, the hollow shaft journalled by two bearings in the housing of the reduction gear.

5. Drive as in claim 1, the pinion shaft journalled by two bearings in the housing of the reduction gear.

6. Drive as in claim 1, there being a second engine, a second shift clutch for driving a second pinion shaft, a second hollow shaft on the second pinion shaft, a second auxiliary shaft geared to the second hollow shaft, and a second coupling for coupling the input of the second clutch also to the second hollow shaft, the two shift clutches operating selectively, the second pinion shaft likewise coupled to the propeller shaft.

7. Drive for ships having at least one drive engine, propeller shaft and reduction gear disposed in a housing, the combination comprising:

a pinion shaft journalled in the housing and geared to the propeller shaft;

a shift clutch having (a) a rotatable output part concentrical on the pinion shaft, (b) an operable shift element coupled by resilient elements to the output part, (c) a rotatable input part concentrical to the output part selectively connectable to the shift element, and having first axial end flange coupled to the engine and second axial end flange extending in opposite direction along the axis of the pinion shaft;

a coupling having input axially flanged to the second axial end flange of the clutch and rotating therewith, further having output coaxial therewith;

a hollow shaft telescoped in the pinion shaft and being journalled in the housing independently from the pinion shaft by means of two bearings, the hollow shaft axially coupled to the coupling for rotation therewith; and auxiliary equipment geared to the hollow shaft.

* * * * *